United States Patent
Jaradi et al.

(10) Patent No.: US 11,628,795 B1
(45) Date of Patent: Apr. 18, 2023

(54) MIDDLE CONSOLE AIRBAG

(71) Applicant: Ford Global Technologies, LLC, Dearborn, MI (US)

(72) Inventors: Dean M. Jaradi, Macomb, MI (US); Zhenyan Gao, Northville, MI (US); Mohammad Omar Faruque, Ann Arbor, MI (US); S. M. Iskander Farooq, Novi, MI (US); Luohui Long, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/742,449

(22) Filed: May 12, 2022

(51) Int. Cl.
*B60R 21/231* (2011.01)
*B60R 21/20* (2011.01)
*B60R 21/2338* (2011.01)

(52) U.S. Cl.
CPC ........ *B60R 21/23138* (2013.01); *B60R 21/20* (2013.01); *B60R 21/2338* (2013.01); *B60R 2021/23153* (2013.01); *B60R 2021/23161* (2013.01); *B60R 2021/23386* (2013.01)

(58) Field of Classification Search
None
See application file for complete search history.

(56) References Cited

U.S. PATENT DOCUMENTS

| | | | |
|---|---|---|---|
| 6,966,576 B1 | 11/2005 | Greenstein | |
| 9,227,587 B1 | 1/2016 | Belwafa et al. | |
| 9,688,232 B1 | 6/2017 | Loew | |
| 10,543,802 B1 | 1/2020 | Makowski et al. | |
| 10,926,735 B2* | 2/2021 | Deng | B60R 21/231 |
| 11,225,219 B2* | 1/2022 | Kobayashi | B60R 21/2176 |
| 11,433,848 B1* | 9/2022 | Faruque | B60R 21/264 |
| 2006/0129024 A1 | 6/2006 | Weatherbee | |
| 2009/0001695 A1* | 1/2009 | Suzuki | B60R 21/231 |
| | | | 280/730.2 |
| 2011/0278826 A1 | 11/2011 | Fukawatase et al. | |
| 2020/0062213 A1 | 2/2020 | Gao et al. | |

FOREIGN PATENT DOCUMENTS

| | | | | |
|---|---|---|---|---|
| CN | 111152748 A | * | 5/2020 | ............ B60R 21/20 |
| DE | 2018002853 A1 | | 10/2018 | |
| EP | 3378709 B1 | | 9/2021 | |
| FR | 2931420 A1 | * | 11/2009 | .......... B60R 21/231 |
| GB | 2289242 B | | 11/1995 | |
| JP | 2010115947 A | | 5/2010 | |
| JP | 2016088413 A | * | 5/2016 | |

* cited by examiner

*Primary Examiner* — Faye M Fleming
(74) *Attorney, Agent, or Firm* — Frank A. MacKenzie; Bejin Bieneman PLC

(57) ABSTRACT

An assembly for a vehicle includes a middle console. The assembly includes a seatback including a vehicle-rearward side. The assembly includes an airbag supported by the middle console. The airbag is inflatable to an inflated position. The airbag in the inflated position includes a middle portion and an extension. The extension extends from the middle portion along the vehicle-rearward side of the seatback.

20 Claims, 5 Drawing Sheets

MIDDLE CONSOLE AIRBAG

BACKGROUND

A vehicle includes a middle console between two front seats. The middle console may include an armrest designed to support the arm of occupants of the vehicle seated in the front seats. The middle console may include a storage compartment below the armrest. In such an example, the armrest is moveably attached to the middle console. The storage compartment may be designed to store items, e.g., personal items belonging to a vehicle occupant.

Vehicles are equipped with airbag assemblies that include an airbag and an inflator. In the event of a vehicle impact, the inflator activates and provides inflation medium to the airbag. This pressurizes the airbag to control the kinematics of an occupant during the vehicle impact. The airbag assemblies may be located at various positions in a passenger compartment of the vehicle, including between the front seats of the vehicle.

DETAILED DESCRIPTION

Figure 1:
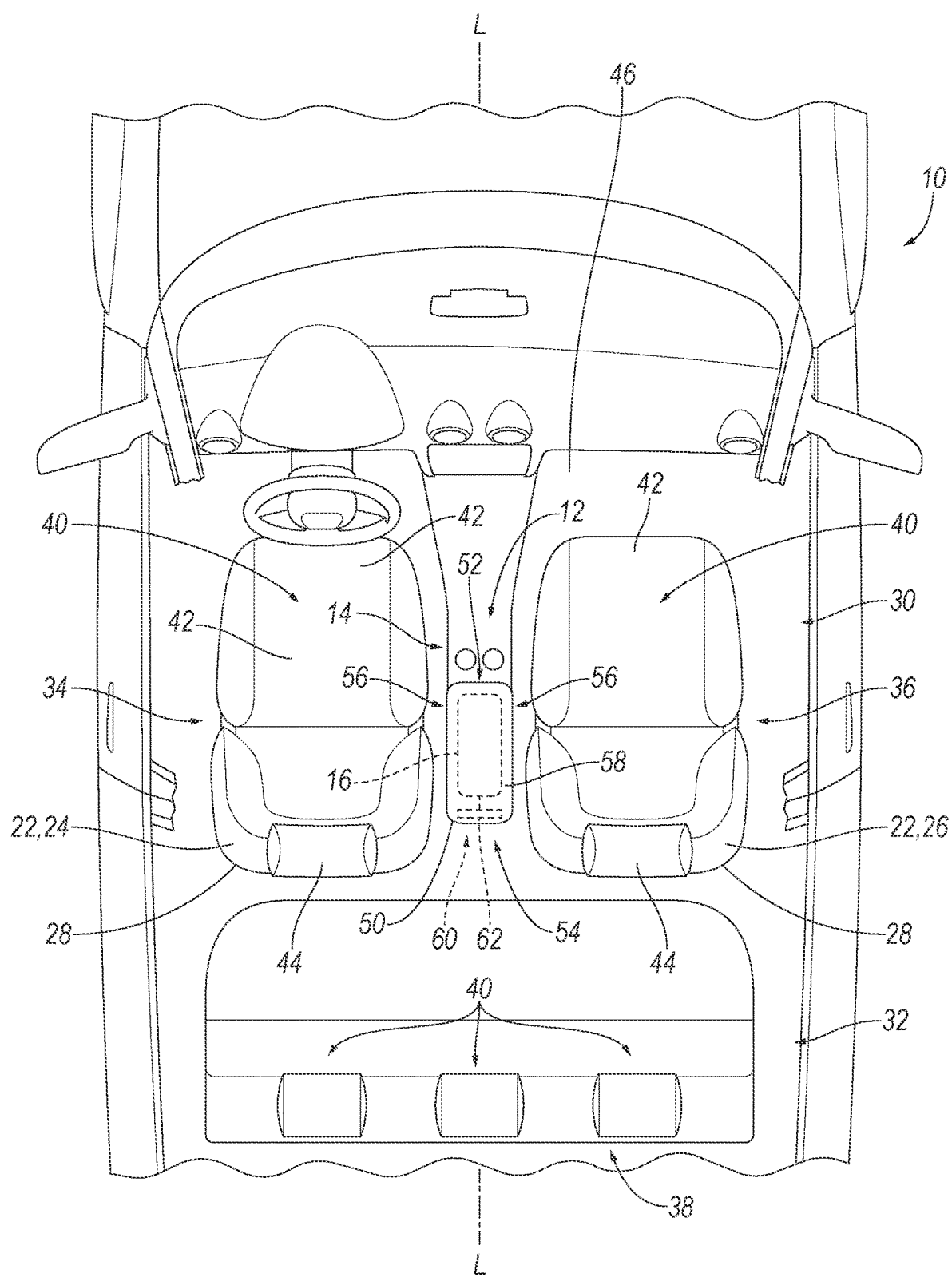
FIG. 1 is a top view of a portion of a vehicle including an airbag in a middle console in an uninflated position.

An assembly includes a middle console, a seatback including a vehicle-rearward side, and an airbag supported by the middle console and inflatable to an inflated position. The airbag in the inflated position includes a middle portion and an extension. The extension extends from the middle portion along the vehicle-rearward side of the seatback.

The assembly may include a second seatback including a vehicle-rearward side and the airbag may include a second extension extending from the middle portion along the vehicle-rearward side of the second seatback. The extension and the second extension may extend from the middle portion on a common cross-vehicle axis. The middle portion may be between the seatback and the second seatback in the inflated position. The seatback and the second seatback may each define an occupant-seating area, the middle portion being between the occupant seating area of the seatback and the occupant seating area of the second seatback. The middle portion may be between the seatback and the second seatback in the inflated position. The extension in the inflated position may abut the vehicle-rearward side of the seatback and the second extension in the inflated position may abut the vehicle-rearward side of the second seatback.

The extension may extend from the middle portion in a cross-vehicle direction. The middle portion may be elongated along a vehicle-longitudinal axis.

The middle portion may be elongated along a vehicle-longitudinal axis.

The airbag may extend upwardly from the middle console in the inflated position.

The middle console may include a bin and a lid rotatably connected to the bin, the airbag in an uninflated position being supported by the lid. The assembly may include an inflator in fluid communication with the airbag, the inflator being supported by the lid.

The assembly may include an external tether extending from the middle console to the middle portion and another external tether extending from the middle console to the extension.

The middle console may be elongated along a vehicle-longitudinal axis and the middle portion may be elongated along the vehicle-longitudinal axis.

An assembly includes a middle console having an uppermost side and a vehicle-rearward side. The middle console terminates at an uppermost side and a vehicle-rearward side. The middle console is elongated along an axis. An airbag is supported by the middle console in an uninflated position and is inflatable upwardly from the middle console above the uppermost side to an inflated position. The airbag in the inflated position includes a middle portion and an extension. The middle portion is elongated along the axis and the extension extends from the vehicle-rearward side of the middle portion transverse to the axis.

The airbag may include a second extension extending from the middle portion transverse to the axis in a direction opposite the extension.

The extension and the second extension may extend from the middle portion on a common axis.

The middle console may include a bin and a lid rotatably connected to the bin, the airbag in the uninflated position being supported by the lid.

The assembly may include an inflator in fluid communication with the airbag, the inflator being supported by the lid.

With reference to the figures, wherein like numerals indicate like parts throughout the several views, an assembly 12 for a vehicle 10 includes a middle console 14. The assembly 12 includes a seatback 22 including a vehicle-rearward side 28. The assembly 12 includes an airbag 16 supported by the middle console 14. The airbag 16 is inflatable to an inflated position. The airbag 16 in the inflated position includes a middle portion 18 and an extension 20. The extension 20 extends from the middle portion 18 along the vehicle-rearward side 28 of the seatback 22.

Since the extension 20 extends from the middle portion 18 along the vehicle-rearward side 28 of the seatback 22, the seatback 22 acts as a reaction surface for the airbag 16 in the inflated position and the extension 20 maintains engagement of the middle portion 18 with the seatback 22. In other words, the engagement of the extension 20 with the vehicle-rearward side 28 of the seatback 22 pins the middle portion 18 of the airbag 16 against the seatback 22. In the event of a vehicle 10 impact that urges an occupant cross-vehicle 10, e.g., a side impact, the middle portion 18 of the airbag 16 abuts the seatback 22 and the extension 20 extends along the vehicle-rearward side 28 of the seatback 22 to maintain engagement of the middle portion 18 with the seatback 22.

In examples shown in the figures, the seatback 22 is a first seatback 24 and the vehicle 10 includes a second seatback 26 spaced cross-vehicle 10 from the first seatback 24. In such an example, the middle portion 18 of the airbag 16 is between the seatbacks 24, 26 in the inflated position. As an example the airbag 16 may include a second extension 20 extending from the middle portion 18 along the vehicle-rearward side 28 of the second seatback 26. In such an example, the second seatback 26 acts as a second reaction surface for the airbag 16. Specifically, when the occupant is urged into the airbag 16 as described above, the engagement of the second extension 20 with the vehicle-rearward side 28 of the second airbag 16 acts as another reaction surface for the airbag 16. In addition, in such an example, the airbag 16 uses at least one of the two seatbacks 24, 26 as a reaction surface, i.e., through one or both extensions 20, during impact from the direction of either of the seatbacks 24, 26. In other words, the airbag 16 operates similarly for an occupant on the first seatback 24 subject to a far-side impact as for an occupant on the second seatback 26 subject to a far-side impact.

The vehicle 10 may be any suitable type of ground vehicle 10, e.g., a passenger or commercial automobile such as a sedan, a coupe, a truck, a sport utility, a crossover, a van, a minivan, a taxi, a bus, etc.

Figure 3:
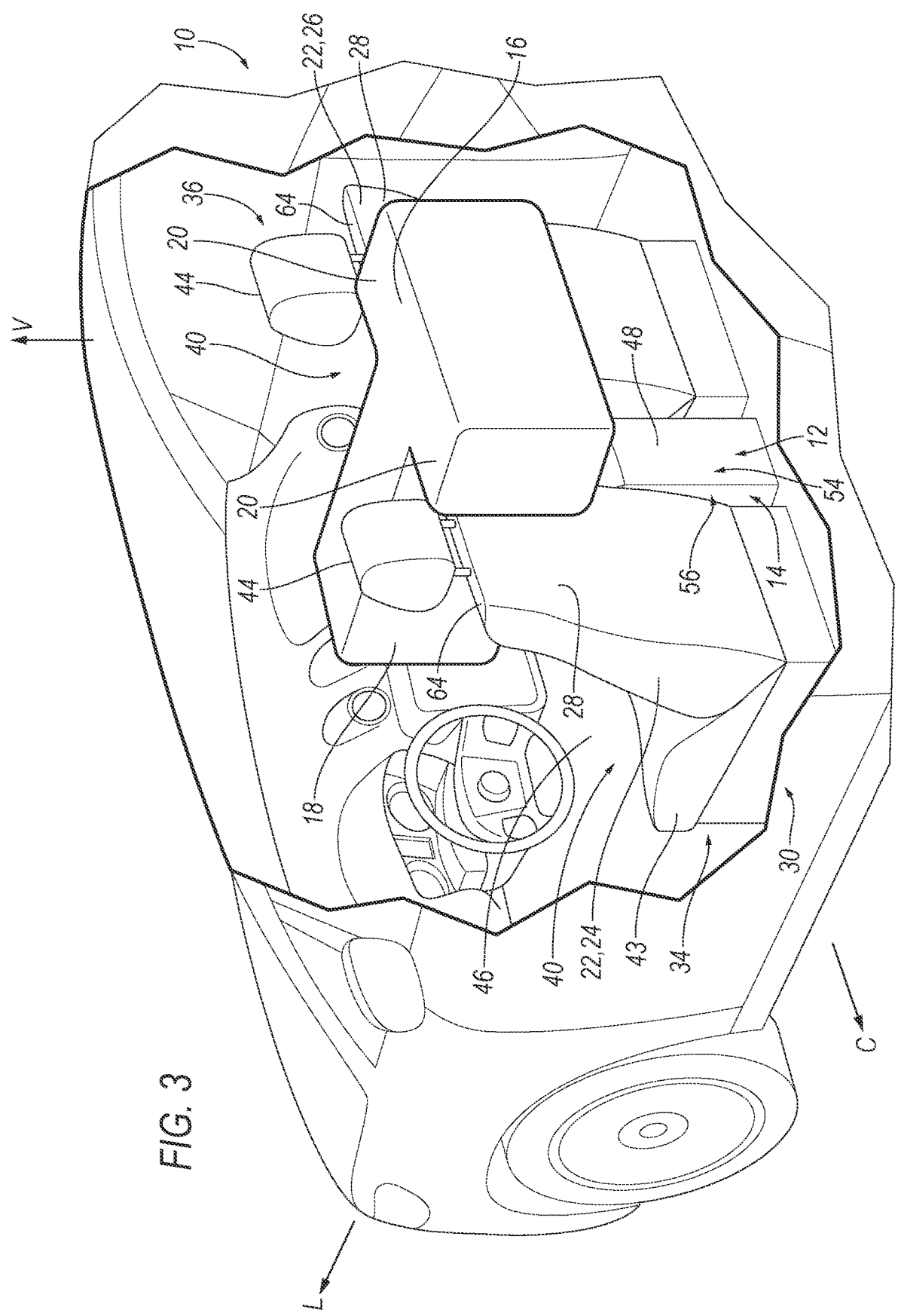
FIG. 3 is a cut-away view of the vehicle with the airbag in the inflated position.

With reference to FIG. 3, the vehicle 10 defines a vehicle-longitudinal axis L extending between a front end (not numbered) and a rear-end (not numbered) of the vehicle 10. The vehicle 10 defines a cross-vehicle axis C extending cross-vehicle from one side to the other side of the vehicle 10. The vehicle 10 defines a vertical axis V extending through a floor 46 and a roof (not numbered) of the vehicle 10. The vehicle-longitudinal axis L, the cross-vehicle axis C, and the vertical axis V are perpendicular relative to each other.

The vehicle 10 includes a vehicle body (not numbered). The vehicle body may be of a unibody construction, a body-on-frame construction, or any other suitable construction. The vehicle body may be of any suitable material, for example, steel, aluminum, and/or fiber-reinforced plastic, etc.

The vehicle 10, specifically the vehicle body, includes a passenger compartment (not numbered) to house occupants of the vehicle 10. The passenger compartment may extend across the vehicle 10, i.e., from one side to the other side of the vehicle 10. The passenger compartment includes a front end and a rear end with the front end being in front of the rear end during forward movement of the vehicle 10.

The vehicle body includes the floor 46 and may include the roof. The roof may define the upper boundary of the passenger compartment and may extend from the front end of the passenger compartment to the rear end of the passenger compartment. The floor 46 is below from the roof. The floor 46 may define the lower boundary of the passenger compartment and may extend from the front end of the passenger compartment to the rear end of the passenger compartment.

The vehicle 10 includes seats in the passenger cabin. The seats may be arranged in the passenger cabin in any suitable position, e.g., in rows such as a front row 30, second row 32 behind the front row 30, a third row behind the second row 32, etc. In the example shown in FIG. 1, the seats are arranged in a front row 30 and a second row 32. Specifically, in such an example, the vehicle 10 includes two front seats 34, 36 34, 36, hereinafter referred to as a first front seat 34 and a second front seat 36, and includes rear seats 38. The front seats 34, 36 34, 36 are spaced each other cross-vehicle 10 with the middle console 14 disposed therebetween. The front seats 34, 36 34, 36, specifically, may be a driver seat and a passenger seat, respectively. In the example shown in the figures, the first front seat 34 is a driver seat and the second front seat 36 is a passenger seat and in other examples the first front seat 34 may be a passenger seat. The adjectives "first" and "second" with reference to the front seats 34, 36 are used as identifiers and do not indicate order or importance. The front seats 34, 36 may be bucket seats, as shown in the figures, or may be of any suitable configuration.

The rear seat 38 is vehicle-rearward of the front seats 34, 36 and the middle console 14. The rear seat 38 may be, for example, a bench seat as shown in the figures. In such an example, the rear seat 38 includes an occupant-seating area 40 and seatbelt (not numbered) for each of a plurality of occupants, e.g., three occupants in the example shown in the figures. As another example, the vehicle 10 may include a plurality of rear seats arranged cross-vehicle 10, e.g., bucket seats, captain chairs, etc.

Each of the seats, i.e., the front seats 34, 36 and the rear seat in the example shown in the figures, includes the seatback 22 and a seat bottom 42. The seatback 22 may be supported by the seat bottom 42 and may be stationary or movable relative to the seat bottom 42. The seatback 22 and the seat bottom 42 may be adjustable in multiple degrees of freedom. Specifically, the seatback 22 and the seat bottom 42 may themselves be adjustable, in other words, adjustable components within the seatback 22 and/or the seat bottom 42, and/or may be adjustable relative to each other. Each of the seats may include a head restraint 44 supported by the seatback 22 and disposed above the seatback 22.

The seatback 22 may include a seatback frame and a covering supported on the seatback frame. The seatback frame may include tubes, beams, etc. Specifically, the seatback frame includes a pair of upright frame members. The upright frame members are elongated, and specifically, are elongated in a generally upright direction when the seatback 22 is in a generally upright position. The upright frame members are spaced from each other and the seatback frame includes cross-members (not shown) extending between the upright frame members. The seatback frame, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame may be formed of a suitable metal, e.g., steel, aluminum, etc.

The covering may include upholstery and padding. The upholstery may be cloth, leather, faux leather, or any other suitable material. The upholstery may be stitched in panels around the frame. The padding may be between the covering and the seatback frame and may be foam or any other suitable material.

The seatbacks 22 of the front seats 34, 36 each include a vehicle-rearward side 28 that faces vehicle-rearward when the front seats 34, 36 are forward-facing. In other words, vehicle-rearward sides 28 of the seatbacks 22 are also the seat-rearward sides of the seatbacks 22. The vehicle-rearward side 28 of the seatback 22 is opposite the occupant-seating area 40

Each of the seats defines at least one occupant-seating area. The seatback 22 and the seat bottom 42 of the seat may define at least one occupant-seating area 40. The occupant-seating area 40 is the space occupied by an occupant properly seated on the seat. The occupant-seating area 40 is seat-forward of the seatback 22 and above the seat bottom 42. In the example shown in the figures, the front seats 34, 36 each define one occupant-seating area 40 and the rear seat 38 defines a plurality of occupant-seating areas 40.

The middle console 14 is between the two front seats 34, 36. The middle console 14 may be on a longitudinal midline of the vehicle 10, i.e., on the longitudinal axis L, as shown in the figures. In other examples, the middle console 14 may be in the middle of two adjacent seats, e.g., front seats 34, 36, and offset from the longitudinal midline of the vehicle 10.

The middle console 14 may be supported by the floor 46. Specifically, the middle console 14 extends upwardly from the floor 46 between the first front seat 34 and the second front seat 36. In such an example, the middle console 14 abuts the floor 46 and may be connected to the floor 46, e.g., with fasteners such as threaded fasteners. As another example, the middle console 14 may be supported by one of the seats. The middle console 14 may be, for example, plastic such as acrylonitrile butadiene styrene (ABS), vinyl, etc. The middle console 14 may include a class-A surface exposed to the passenger cabin, i.e., a finished surface free of unaesthetic blemishes and defects and exposed to view by a vehicle 10 occupant seated in the vehicle 10. The middle console 14 may include cup holders and may support vehicle 10 controls, e.g., a gear shifter, window controls, HVAC controls, multimedia controls, etc.

The middle console 14 may include a base 48 and an armrest 50. The armrest 50 is above the base 48 and, for example, may be supported by the base 48. The armrest 50 is designed to support the arm of occupants of the vehicle 10 seated in the front seats 34, 36. Specifically, the armrest 50 is sized, shaped, and positioned to support the arm of the occupant. The armrest 50 may be upholstered, e.g., with a covering of vinyl, leather, etc.

The middle console 14 may include a storage compartment (not numbered) below the armrest 50. In such an example, the armrest 50 is moveably attached to the base 48. The storage compartment may be designed to store items, e.g., personal items belonging to a vehicle 10 occupant. The armrest 50 may be selectively moveable relative to the base 48 to cover and uncover the storage compartment. In such examples, the base 48 is a bin and the armrest 50 is a lid of the storage compartment to allow access to the storage compartment. As an example, the armrest 50 may be rotatable relative to the storage compartment. In such an example, a hinge rotatably connects the armrest 50 to the middle console 14. Specifically, the armrest 50 may be rotatable upwardly from the storage compartment about the hinge between a closed position and an open position.

The middle console 14 includes a vehicle-forward side 52 and a vehicle-rearward side 54. The vehicle-forward side 52 is vehicle-forward of the vehicle-rearward side 54. The vehicle-forward side 52 faces vehicle-forward and the vehicle-rearward side 54 faces vehicle rearward. The middle console 14 may include two lateral sides 56 spaced from each other and each extending from the vehicle-forward side 52 to the vehicle-rearward side 54. The middle console 14 terminates at the vehicle-forward side 52, the vehicle-rearward side 54, and the two lateral sides 56. As an example, the middle console 14 may be rectangular in a horizontal cross-section. The middle console 14 may be elongated from the vehicle-forward side 52 to the vehicle-rearward side 54. Specifically, the middle console 14 may be elongated along the vehicle-longitudinal axis L. The middle console 14 has an uppermost side 58 that faces upwardly. The middle console 14 terminates at the uppermost side 58. The uppermost side 58 may be, for example, on the armrest 50.

Figure 2:
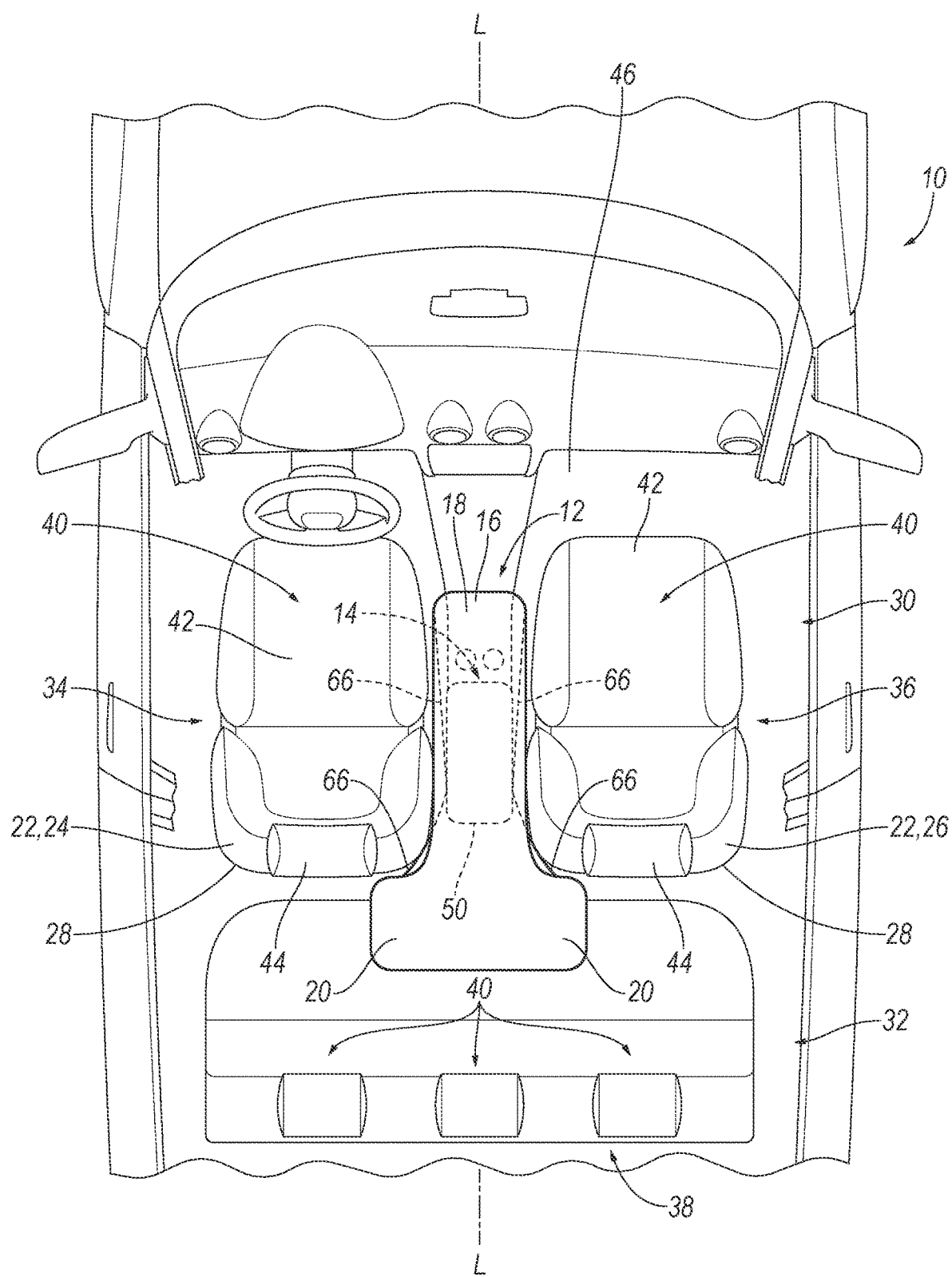
FIG. 2 is the view of FIG. 1 with the airbag in an inflated position.
Figure 4:
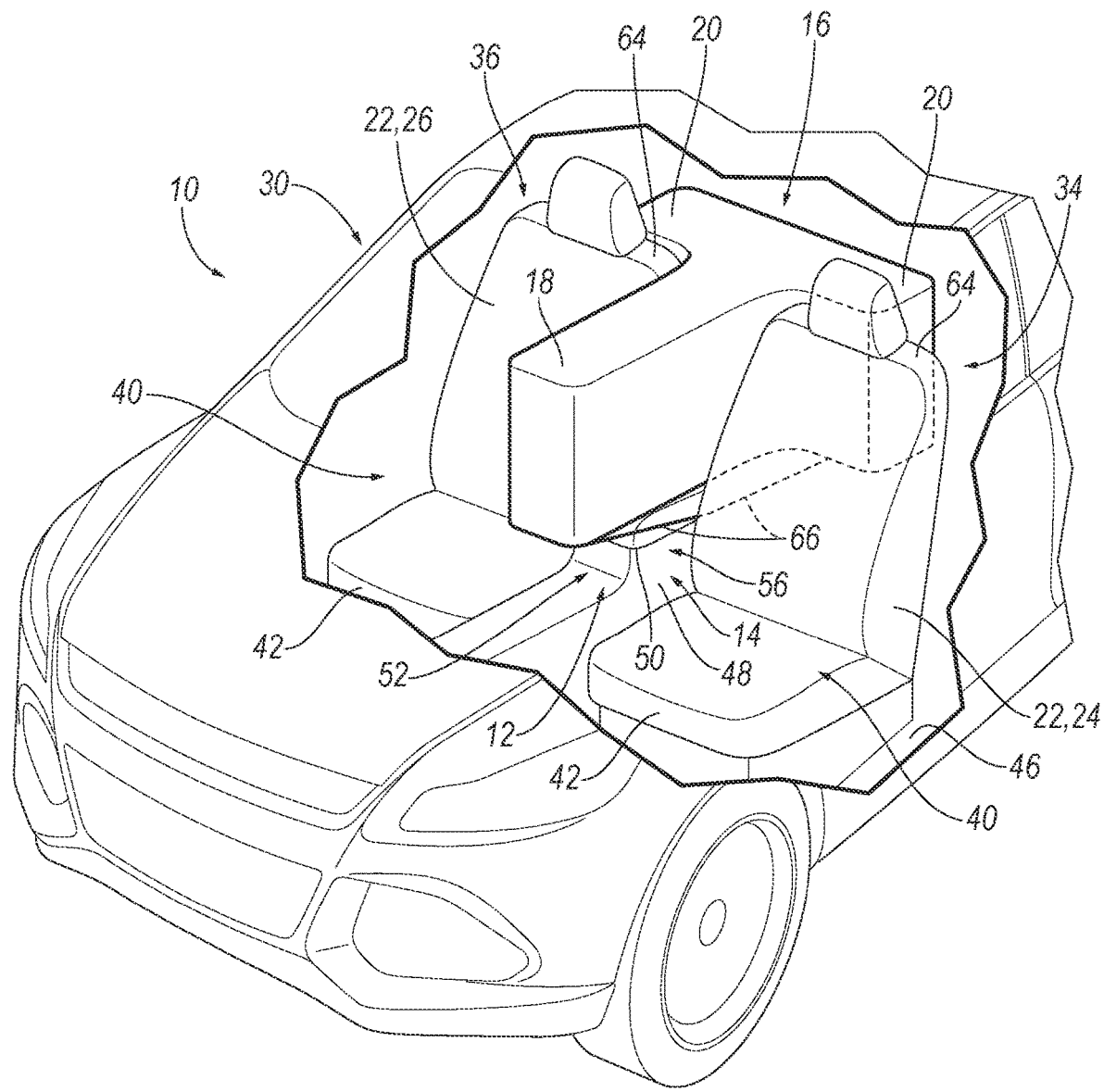
FIG. 4 is a cut-away view of the vehicle with the airbag in the inflated position.
Figure 5:
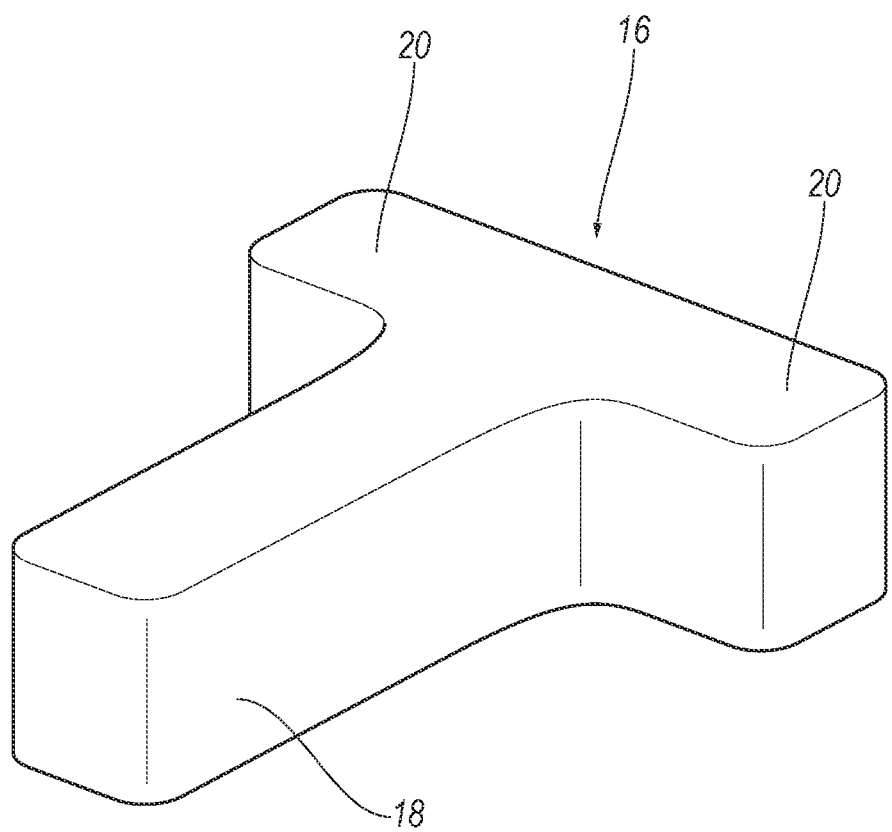
FIG. 5 is a perspective view of the airbag in an inflated position.

The vehicle 10 includes an airbag assembly 60 including the airbag 16. The airbag assembly 60 includes an inflator 62 and may include a housing (not shown). The inflator 62 inflates the airbag 16 from an uninflated position, as shown in FIG. 1, to the inflated position, as shown in FIGS. 2-4. In examples including the housing, the housing houses the airbag 16 in the uninflated position and supports the airbag 16 in the inflated position. The airbag 16 may be rolled and/or folded to fit within the housing in the uninflated position. The housing may be of any suitable material, e.g., a rigid polymer, a metal, a composite, or a combination of rigid materials.

The airbag assembly 60 is supported by the middle console 14. In other words, the weight of the airbag assembly 60 is borne by the middle console 14. Specifically, the airbag assembly 60 may be supported by and fixed to the armrest 50 of the middle console 14. In examples including the housing, the housing may, for example, include clips, threaded fasteners, etc., for attaching the housing to the armrest 50. In other examples, the airbag 16 may be rolled or folded and attached directly to the armrest 50.

The airbag 16 is supported on the armrest 50, e.g., the lid, directly or indirectly, e.g., through the housing, in the uninflated position and the inflated position. In the uninflated position, the airbag 16 may be concealed from view. For example, the airbag 16 may be below the covering of the armrest 50 in the uninflated position. When inflated, the airbag 16 may break through the covering of the armrest 50, e.g., through the uppermost side 58, and extends upwardly through the covering above the armrest 50. The covering of the armrest 50 may, for example, include a tear seam for the airbag 16 to break through to the inflated position.

The airbag 16 is inflatable upwardly from the armrest 50, e.g., the lid. Specifically, the airbag 16 is inflatable upwardly from the middle console 14 above the uppermost side 58 to an inflated position.

In the inflated position, the airbag 16 is between the front seats 34, 36. Specifically, the airbag 16 in the inflated position separates occupants of the front seats 34, 36. Specifically, the airbag 16 in the inflated position is designed, i.e., sized, shaped, and positioned, to separate the head and torso of an occupant the first front seat 34 from the head and torso of the occupant of the second front seat 36. As an example, the airbag 16 in the inflated position, e.g., at least the middle portion 18, extends upwardly toward an uppermost surface 64 of the seatback 22. For example, the middle portion 18 may extend higher than the uppermost surface 64 of the seatback 22 in the inflated position. In some examples, the middle portion 18 may extend as high as or higher than the head restraint 44 above the seatback 22. In the example shown in the figures, the middle portion 18 and the extensions 20 extend higher than the uppermost surface 64 of the seatback and lower than the uppermost surface of the head restraint 44. The airbag 16 controls the kinematics of the occupants of the front seats 34, 36. Specifically, the airbag 16 controls the kinematics of the occupant at least during a far-side vehicle 10 impact.

The airbag 16 is designed to extend behind at least one of the seatbacks 22 of the front seats 34, 36. Specifically, the airbag 16 extends along the vehicle-rearward side 28 of the seatback 22 in the inflated position so that the seatback 22 acts as a reaction surface for the airbag 16 as the airbag 16 maintains engagement with the seatback 22 behind the seatback 22.

Specifically, the airbag 16 in the inflated position includes a middle portion 18 and at least one extension 20. The middle portion 18 extends between the front seats 34, 36 in the inflated position. Specifically, the middle portion 18 in the inflated position is between the occupant-seating area 40 of the first front seat 34 and the occupant-seating area 40 of the second front seat 36 and is between the seatback 22 of the first front seat 34 and the seatback 22 of the second front seat 36. The middle portion 18 in the inflated position extends to the vehicle-rearward side 54 of the middle console 14 above the middle console 14. For example, the middle portion 18 in the inflated position may extend from the vehicle-forward side 52 to the vehicle-rearward side 54 of the middle console 14 above the middle console 14. The middle portion 18 of the airbag 16 may be elongated along the vehicle-longitudinal axis. In the example shown in the figures, the middle console 14 is elongated along the vehicle-longitudinal axis L, as described above, and the middle portion 18 is elongated along the vehicle-longitudinal axis L.

In the example shown in the figures, the airbag 16 includes two extensions 20, as described further below. In such examples, one of the extensions 20 extends behind the first front seat 34 and the other extension 20 extends behind the second front seat 36. The adjectives "first" and "second" with reference to the extensions 20 and the front seats 34, 36 are used as identifiers and do not indicate order or importance. In some examples, including the example shown in the figures, the extensions 20 may be mirror images of each other. Common numerals are used to identify common features of the two extensions 20 in the figures. In other examples, the airbag 16 may include one extension 20 and in such examples the extension 20 may extend behind the first front seat 34 or the second front seat 36.

The extension 20 extends from the middle portion 18 along the vehicle-rearward side 28 of the respective seatback 22. Specifically, one extension 20 extends from the middle portion 18 along the vehicle-rearward side 28 of the seatback 22 of the first front seat 34 and one extension 20 extends from the middle portion 18 along the vehicle-rearward side 28 of the seatback 22 of the second front seat 36. The extension 20 in the inflated position abuts the vehicle-rearward side 28 of the respective seatback 22.

The extension 20 extends from the middle portion 18 transverse to an axis along which the extension 20 is elongated. For example, the extension 20 extends from the middle portion 18 transverse to the longitudinal axis L. The extension 20 extends from the middle portion 18 in a cross-vehicle direction. As an example, the extension 20 may extend from the middle portion 18 along the cross-vehicle axis C, i.e., parallel to the cross-vehicle axis C. For example, as set forth above, in the example shown in the figures, the middle portion 18 is elongated along the longitudinal axis L and the extensions 20 extend from the middle portion 18 along the cross-vehicle axis C.

In examples including two extensions 20, the extensions 20 extend from the middle portion 18 on a common axis. For example, the extensions 20 and the second extension 20 extend from the middle portion 18 on a common axis that is along, i.e., parallel to, the cross-vehicle axis C.

The extension 20 is on a vehicle-rearward half of the middle portion 18. For example, the extension 20 may extend from the vehicle-rearward side 54 of the middle portion 18.

The extension 20 and the middle portion 18 are in fluid communication and are inflated by the same inflator 62. Specifically, the middle portion 18 defines an inflation chamber and the extension 20 defines an inflation chamber in fluid communication with the inflation chamber of the middle portion 18. The inflation chamber of the middle portion 18 and the inflation chamber of extension 20 may be open to each other, e.g., the airbag 16 may include a single inflation chamber that extends across both the middle portion 18 and the extension 20.

In the example shown in the figures, the extensions 20 have the same vertical height as the middle portion 18. In other examples, extensions 20 may be tall than or shorter than the middle portion 18.

The airbag 16 may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

The inflator 62 is in fluid communication with the airbag 16. The inflator 62 expands the airbag 16 with inflation medium, such as a gas, to move the airbag 16 from the uninflated position to the inflated position. The inflator 62 may be supported by the armrest 50, i.e., the weight of the inflator 62 is borne by the armrest 50. In such examples, the inflator 62 may be directly connected to the armrest 50 or indirectly connected to the armrest 50. For example, in examples including the housing, the inflator 62 may be supported by the housing and the housing may be supported by the armrest 50. In other examples, the inflator 62 may be supported by the base 48 of the middle console 14, the floor 46 of the vehicle 10, etc. The inflator 62 may be, for example, a pyrotechnic inflator 62 that ignites a chemical reaction to generate the inflation medium, a stored gas inflator 62 that releases (e.g., by a pyrotechnic valve) stored gas as the inflation medium, or a hybrid. The inflator 62 may be, for example, at least partially in the inflation chamber to deliver inflation medium directly to the inflation chamber or may be connected to the inflation chamber through fill tubes, diffusers, etc.

The airbag assembly 60 may include one or more external tethers 66 extending from the middle console 14 to the airbag 16 to position the airbag 16 and to control movement of the airbag 16 in the inflated position. In such examples, the tethers 66 may extend from the armrest 50 to the airbag 16. As an example, the airbag assembly 60 may include a tether 66 extending from the armrest 50 to a vehicle-forward portion of the middle portion 18 and a tether 66 extending from the armrest 50 to the extension 20. In such an example, the airbag 16 may include two tethers 66 extending from the armrest 50 to the middle portion 18, i.e., spaced cross-vehicle 10 on opposite sides of the middle portion 18, and two tethers 66 extending from the armrest 50 to the extensions 20, e.g., one tether 66 extending from the armrest 50 to one extension 20 and another tether 66 extending from the armrest 50 to the other extension 20.

The vehicle 10 includes a computer (not shown) having a processor and a memory storing instructions executable by the processor to deploy the airbag 22. The computer is programmed to perform the function described herein. The computer may be, for example, a restraints control module. Use of "in response to," "based on," and "upon determining" herein indicates a causal relationship, not merely a temporal relationship.

The vehicle 10 may include at least one impact sensor (not shown) for sensing impact of the vehicle 10. The impact sensor may be configured to sense impact with a pedestrian. Alternatively or additionally, the sensor may be configured to sense a pedestrian pre-impact. The impact sensor may be configured to sense conditions of the vehicle 10. The impact sensor may, for example, be further defined as a plurality of impact sensors of the same or of different types. For example, the plurality of impact sensors may include a remote object sensor coupled to controller to generate an object signal in the presence of an object, e.g., a pedestrian, within a field of view. The remote object sensor may include one or more types of sensors including radar, lidar, and/or a vision system. The vision system may include one or more cameras, CCD image sensors, and/or CMOS image sensors, etc. The remote object sensor is configured to sense the presence and the distance of an object from the vehicle 10 and may determine characteristics of the detected objects, such as, radar reflective properties, the area, height, and/or width of the object.

The computer is an example storage medium. Storage medium may be any non-transitory computer-readable storage medium or machine-readable storage medium, such as an optical, magnetic or semiconductor storage medium. In various implementations, storage medium may be an article of manufacture. In some implementations, storage medium may store computer-executable instructions, such as computer-executable instructions to implement logic flow. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

The vehicle 10 includes a communication network that can include a bus in the vehicle 10 such as a controller area network (CAN) or the like, and/or other wired and/or wireless mechanisms. Via the communication network, the computer may transmit messages to various devices in the vehicle 10 and/or receive messages (e.g., CAN messages) from the various devices, e.g., sensors, an actuator, a human machine interface (HMI), etc. Alternatively or additionally, in cases where the computer includes a plurality of devices, the vehicle 10 communication network may be used for communications between devices represented as the computer in this disclosure. Further, as mentioned below, various controllers and/or sensors may provide data to the computer via the vehicle 10 communication network.

The numerical terms adjectives "first" and "second" with respect to the are used herein merely as identifiers and do not signify order or importance. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a middle console;
   a seatback including a vehicle-rearward side;
   an airbag supported by the middle console and inflatable to an inflated position;
   the airbag in the inflated position including a middle portion and an extension, the extension extending from the middle portion along the vehicle-rearward side of the seatback; and
   an external tether extending from the middle console to the middle portion and another external tether extending from the middle console to the extension.

2. The assembly of claim 1, further comprising a second seatback including a vehicle-rearward side, the airbag including a second extension extending from the middle portion along the vehicle-rearward side of the second seatback.

3. The assembly of claim 2, wherein the extension and the second extension extend from the middle portion on a common cross-vehicle axis.

4. The assembly of claim 2, wherein the middle portion is between the seatback and the second seatback in the inflated position.

5. The assembly of claim 2, wherein the seatback and the second seatback each define an occupant-seating area, the middle portion being between the occupant seating area of the seatback and the occupant seating area of the second seatback.

6. The assembly of claim 5, wherein the middle portion is between the seatback and the second seatback in the inflated position.

7. The assembly of claim 2, wherein the extension in the inflated position abuts the vehicle-rearward side of the seatback and the second extension in the inflated position abuts the vehicle-rearward side of the second seatback.

8. The assembly of claim 1, wherein the extension extends from the middle portion in a cross-vehicle direction.

9. The assembly of claim 8, wherein the middle portion is elongated along a vehicle-longitudinal axis.

10. The assembly of claim 1, wherein the middle portion is elongated along a vehicle-longitudinal axis.

11. The assembly of claim 1, wherein the airbag extends upwardly from the middle console in the inflated position.

12. The assembly of claim 1, wherein the middle console includes a bin and a lid rotatably connected to the bin, the airbag in an uninflated position being supported by the lid.

13. The assembly of claim 12, further comprising an inflator in fluid communication with the airbag, the inflator being supported by the lid.

14. The assembly of claim 1, wherein the middle console is elongated along a vehicle-longitudinal axis and the middle portion is elongated along the vehicle-longitudinal axis.

15. An assembly comprising:
    a middle console having an uppermost side and a vehicle-rearward side and the middle console terminating at an uppermost side and a vehicle-rearward side, the middle console being elongated along an axis;
    an airbag supported by the middle console in an uninflated position and inflatable upwardly from the middle console above the uppermost side to an inflated position;
    the airbag in the inflated position including a middle portion and an extension, the middle portion being elongated along the axis and the extension extending from the vehicle-rearward side of the middle portion transverse to the axis; and
    an external tether extending from the middle console to the middle portion and another external tether extending from the middle console to the extension.

16. The assembly of claim 15, wherein the airbag includes a second extension extending from the middle portion transverse to the axis in a direction opposite the extension.

17. The assembly of claim 16, wherein the extension and the second extension extend from the middle portion on a common axis.

18. The assembly of claim 15, wherein the middle console includes a bin and a lid rotatably connected to the bin, the airbag in the uninflated position being supported by the lid.

19. The assembly of claim 18, further comprising an inflator in fluid communication with the airbag, the inflator being supported by the lid.

20. An assembly comprising:
a middle console having an uppermost side and a vehicle-rearward side and the middle console terminating at an uppermost side and a vehicle-rearward side, the middle console being elongated along an axis;
an airbag supported by the middle console in an uninflated position and inflatable upwardly from the middle console above the uppermost side to an inflated position;
the airbag in the inflated position including a middle portion and an extension, the middle portion being elongated along the axis and the extension extending from the vehicle-rearward side of the middle portion transverse to the axis;
the middle console includes a bin and a lid rotatably connected to the bin, the airbag in an uninflated position being supported by the lid; and
an inflator in fluid communication with the airbag, the inflator being supported by the lid.

* * * * *